United States Patent [19]

Ikesue et al.

[11] 4,277,163

[45] Jul. 7, 1981

[54] VARIABLE MAGNIFICATION ELECTROSTATIC COPYING MACHINE

[75] Inventors: Masumi Ikesue; Takashi Yano; Susumu Tatsumi; Hiroyuki Idenawa; Isao Nakamura; Tatsuo Tani, all of Tokyo, Japan

[73] Assignee: Ricoh Company, Ltd., Tokyo, Japan

[21] Appl. No.: 59,082

[22] Filed: Jul. 19, 1979

[30] Foreign Application Priority Data

Jul. 21, 1978 [JP] Japan ................................ 53-89093
Aug. 2, 1978 [JP] Japan ................................ 53-93692

[51] Int. Cl.³ ..................... G03G 15/00; G03B 27/34; G03B 27/40

[52] U.S. Cl. ................................ 355/14 R; 355/3 R; 355/56; 355/57

[58] Field of Search .................... 355/3 R, 8, 1, 14 R, 355/55, 56, 57, 59

[56] References Cited

U.S. PATENT DOCUMENTS

| | | | |
|---|---|---|---|
| 3,330,190 | 7/1967 | Taillie | 355/1 |
| 3,398,669 | 8/1968 | Hicks | 355/1 |
| 3,512,861 | 5/1970 | Schackert | 355/1 X |
| 3,653,761 | 4/1972 | Hicks | 355/1 X |
| 3,689,143 | 9/1972 | Case et al. | 355/3 R |
| 4,046,467 | 9/1977 | Laskowski | 355/3 R |
| 4,116,562 | 9/1978 | Libby et al. | 355/3 R X |
| 4,129,373 | 12/1978 | Ogura et al. | 355/8 X |

*Primary Examiner*—Fred L. Braun
*Attorney, Agent, or Firm*—David G. Alexander

[57] ABSTRACT

The vertical and horizontal lengths of an original document (28) are automatically sensed and compared with the vertical and horizontal lengths of a copy sheet (38) and the reduction ratio of a variable magnification optical system (33) is automatically adjusted in accordance therewith so that the maximum length of the image of the document (28) is equal to the corresponding vertical or horizontal length of the copy sheet (38). The image may be selectively parallel to the vertical length or the horizontal length of the copy sheet (38) regardless of whether the image is parallel to the vertical or horizontal length of the document (28). In one form (21) of the invention the document (28) is placed on a platen (27) so that the image is parallel to the vertical length of the platen (27) regardless of whether the image is parallel to the vertical or horizontal length of the document (28). In another form (71) of the invention, the document (28) is placed on the platen (74) so that the vertical length of the document (28) is parallel to the vertical length of the platen (74) regardless of whether the image is parallel to the vertical or horizontal length of the document (28). In the latter form (71) a lever (76) or the like is manually changed over to indicate whether the image is parallel to the vertical or horizontal length of the document (28) and the optical axis of the light image is rotated to one of two positions angularly spaced 90° from each other in accordance with the position of the lever (76).

12 Claims, 16 Drawing Figures

VARIABLE MAGNIFICATION ELECTROSTATIC COPYING MACHINE

BACKGROUND OF THE INVENTION

The present invention relates to a variable magnification electrostatic copying machine comprising means for automatically adjusting the magnification ratio depending on the size of an original document and a copy sheet.

In conventional variable magnification copying the sizes of original documents and copy sheets are compared and a manual magnification control set by the operator. For example, if an A3 size document is to be reproduced on an A4 size copy sheet, the magnification is set at about 70% to reduce the size of the image on the copy sheet relative to the size of the image on the document. Conversely, if a B5 size document is to be reproduced on an A4 size copy sheet, the magnification is set at about 115% to enlarge the size of the image on the copy sheet relative to the size of the image on the document. This manual operation of setting the magnification is a nuisance and results in wasted copies since inexperienced operators often set the wrong magnification and even experienced operators often forget to ensure that the magnification setting is correct.

Another drawback in the art developed heretofore is that on some documents the image is parallel to the long side of the document and on other documents the image is parallel to the short side of the document. Where the magnification is set depending only on the sizes of the documents and copy sheets, the result will be that the copies look just like the originals.

This is not always desirable since where copies of documents are filed or bound together to form a book or report, some of the images on the copies will be vertical whereas others will be horizontal depending on the orientation of the images on the original documents. This means that the book or report must be rotated by 90° to read a horizontal page after reading a vertical page and vice-versa. The book or report is much easier to read if all the images on the pages are oriented in the same direction.

SUMMARY OF THE INVENTION

An electrostatic copying machine embodying the present invention includes a platen for supporting a rectangular original document, a photoconductive member, a variable magnification optical means for focussing a light image of the document onto the photoconductive member to form an electrostatic image, developing means for developing the electrostatic image to form a toner image, support means for supporting a copy sheet and transfer means for moving the copy sheet from the support means into toner image transferring engagement with the photoconductive member, and is characterized by comprising sensor means for sensing a vertical length and a horizontal length of the document on the platen, and computing means for comparing the vertical and horizontal lengths of the document with vertical and horizontal lengths of the copy sheet and adjusting a reduction ratio of the optical means to a value such that a maximum length of the light image of the document is substantially equal to a corresponding one of the vertical and horizontal lengths of the copy sheet.

In accordance with the present invention, the vertical and horizontal lengths of an original document are automatically sensed and compared with the vertical and horizontal lengths of a copy sheet and the reduction ratio of a variable magnification optical system is automatically adjusted in accordance therewith so that the maximum length of the image of the document is equal to the corresponding vertical or horizontal length of the copy sheet. The image may be selectively parallel to the vertical length or the horizontal length of the copy sheet regardless of whether the image is parallel to the vertical or horizontal length of the document. In one form of the invention the document is placed on a platen so that the image is parallel to the vertical length of the platen regardless of whether the image is parallel to the vertical or horizontal length of the document. In another form of the invention, the document is placed on the platen so that the vertical length of the document is parallel to the vertical length of the platen regardless of whether the image is parallel to the vertical or horizontal length of the document. In the latter form a lever or the like is manually changed over to indicate whether the image is parallel to the vertical or horizontal length of the document and the optical axis of the light image is rotated to one of the two positions angularly spaced 90° from each other in accordance with the position of the lever.

It is an object of the present invention to provide a variable magnification electrostatic copying machine comprising novel and unique means for automatically sensing sizes of original documents and copy sheets and optimally adjusting the magnification in accordance therewith.

It is another object of the present invention to provide a variable magnification electrostatic copying machine which allows images on copy sheets to all be aligned in the same direction regardless of the alignment of the images on the original documents.

It is another object of the present invention to provide a generally improved variable magnification electrostatic copying machine.

Other objects, together with the foregoing, are attained in the embodiments described in the following description and illustrated in the accompanying drawing.

DESCRIPTION OF THE PREFERRED EMBODIMENTS

While the variable magnification electrostatic copying machine of the present invention is susceptible of numerous physical embodiments, depending upon the environment and requirements of use, substantial numbers of the herein shown and described embodiments have been made, tested and used, and all have performed in an eminently satisfactory manner.

Figure 1A:
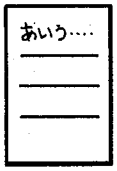
FIGS. 1*a* to 1*c*, 2*a* to 2*c*, 3*a* to 3*c* and 4*a* to 4*c* are diagrams illustrating the novel principles of the present invention.
Figure 1B:
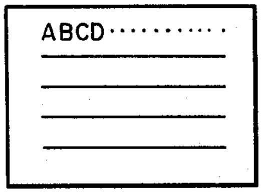
Figure 1C:
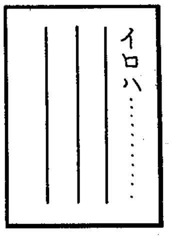

Referring now to FIGS. 1*a* to 1*c*, 2*a* to 2*c*, 3*a* to 3*c* and 4*a* to 4*c* of the drawing, the principles of the present invention will be described. FIG. 1*a* shows an original document of A4 size in which the image is parallel to the long side of the document. FIG. 1*b* shows a B4 size document in which the image is parallel to the short side of the document. In other words, in FIG. 1*a* the image is vertical and the long side of the document is also vertical. In FIG. 1*b* the image is vertical and the short side of the document is also vertical. In FIG. 1*c* the image on a B4 size document is parallel to the long side of the document with both being oriented vertically.

Figure 2A:
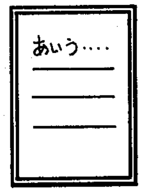
Figure 2B:
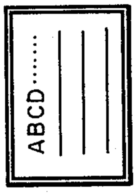
Figure 2C:
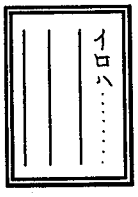

FIGS. 2*a*, 2*b* and 2*c* illustrate copies made of the documents of FIGS. 1*a*, 1*b* and 1*c* respectively by a conventional variable magnification electrostatic copying process. FIG. 1*a* illustrates a unity magnification copy. FIG. 1*b* illustrates a reduced side copy. FIG. 1*c* illustrates a reduced size copy, with all of the copies being on A4 size copy sheets. The images on all of the copies fill the copy sheets.

However, it will be noted that in the copies of FIGS. 2*a* and 2*c* the images are parallel to the long side of the copy sheets whereas in the copy of FIG. 2*b* the image is parallel to the short side of the copy sheet. If the copies of FIGS. 2*a*, 2*b* and 2*c* are bound together to form a book, report or the like, it will be necessary to rotate the book by 90° to read the copy of FIG. 2*b* after reading the copy of FIG. 2*a*. Similarly, it will be necessary to rotate the book 90° back to the original position to read the copy of FIG. 2*c* after reading the copy of FIG. 2*b*. This is a nuisance and makes the book hard to read.

Figure 3A:
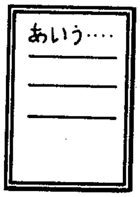
Figure 3B:
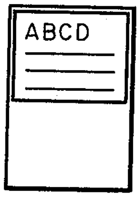
Figure 3C:
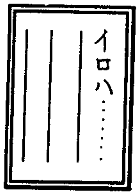

FIGS. 3*a*, 3*b* and 3*c* illustrate copies made in accordance with the present invention from the original documents of FIGS. 1*a*, 1*b* and 1*c* respectively. The copies of FIGS. 3*a* and 3*c* are the same as the copies of FIGS. 2*a* and 2*c* respectively. However in the copy of FIG. 3*b* the image is rotated by 90° so as to be parallel to the long side of the copy sheet as are the images in FIGS. 3*a* and 3*c*. Thus, the copies of FIGS. 3*a* to 3*c* may be bound together in book form and read without rotating the book. It will be noted that there is a blank space under the image in FIG. 3*b*. The copy of FIG. 3*b* may be produced by making the width of the image on the copy sheet equal to the corresponding side, in this case the short side, of the copy sheet. It will be noted that the same relationship holds true for the copies of FIGS. 3*a* and 3*c* since the width of the image is equal to the length of the short side of the copy sheet.

It is possible to yet further generalize the relationship by stating that the maximum length of the image of the document is made equal to the length of the corresponding side of the copy sheet. In FIGS. 3*a* and 3*c*, the maximum length of the image is the vertical length (top to bottom) which is made equal to the corresponding length (the long side or vertical length) of the copy sheet. In FIG. 3*b* the maximum length of the image is the horizontal (side to side) length which is made equal to the corresponding length (the short side or horizontal length) of the copy sheet. The adjustment of image size to correspond to the length of the side of the copy sheet is performed by adjusting the magnification of the optical system to produce a same size (unity magnification), reduced size or enlarged size copy. In accordance with the present invention, the parameter for adjustment is the reduction ratio which is the reciprocal of the magnification. It will be assumed that a reduction ratio having a numerical value less than unity indicates that the size of the image on the copy sheet will be larger than the size of the image on the original document (enlargement). Conversely, a reduction ratio having a numerical value greater than unity indicates that the size of the image on the copy sheet will be smaller than the size of the image on the original document (reduction). For example, a reduction ratio of 2.0 indicates that the size of the image on the copy sheet will be one-half the size of the image on the original document. A reduction ratio of 0.5 indicates that the size of the image on the copy sheet will be two times the size of the image on the original document.

Figure 4A:
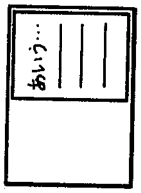
Figure 4B:
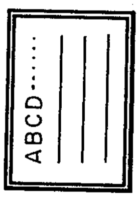
Figure 4C:
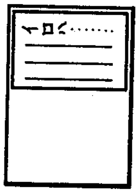

FIGS. 4*a*, 4*b* and 4*c* illustrate that the same principles may be applied to make the images on the copy sheets parallel to the short sides, rather than the long sides, of the copy sheets.

Figure 5:
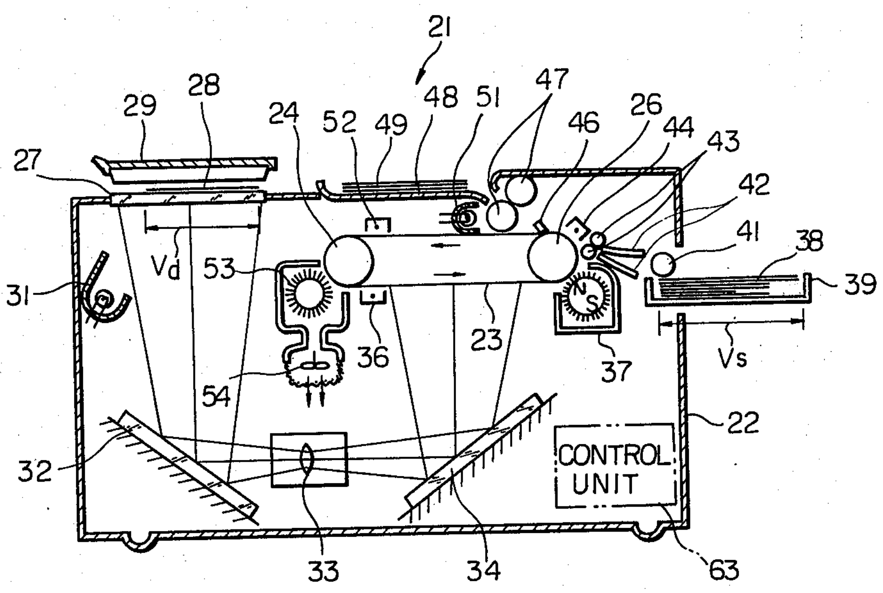
FIG. 5 is a schematic side elevation of a variable magnification electrostatic copying machine embodying the present invention.
Figure 6A:
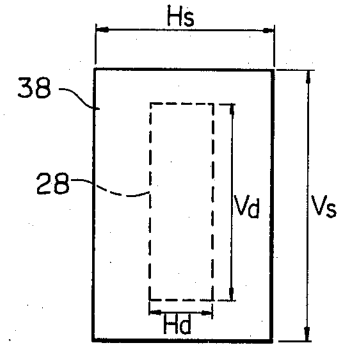
FIGS. 6*a* and 6*b*, 7*a* and 7*b* and 8*a* and 8*b* are diagrams illustrating the computation of reduction ratios in accordance with the present invention.
Figure 6B:
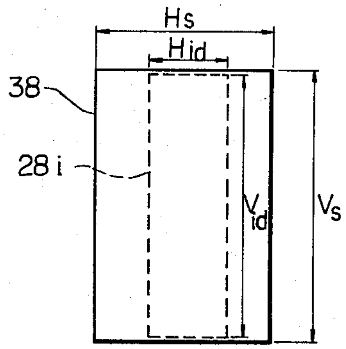
Figure 7A:
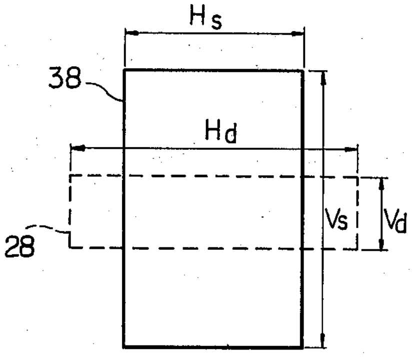
Figure 7B:
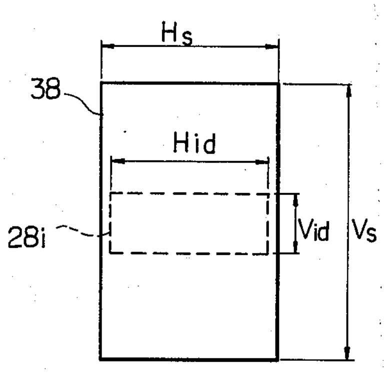

Referring now to FIG. 5, a variable mangification electrostatic copying machine embodying the present invention is illustrated in schematic form and designated by the reference numeral 21. The copying machine 21 comprises a housing 22 in which a photoconductive member in the form of an endless belt 23 is trained around rollers 24 and 26 and rotated counterclockwise at constant spped. A transparent glass platen 27 constitutes part of the upper surface of the housing 22 and supports an original document 28 face down. Further illustrated is a presser plate 29 for pressing the document 28 flat against the platen 27. The platen 27 is square, with the length of one side being at least equal to the maximum length of an original document to be copied. Where, for example, the largest document 28 to be accomodoted is of size A2, the dimensions of the platen 27 are at least 594 mm×594 mm.

The document 28 is illuminated by a light source 31 in the form of a flash lamp. A light image of the document 28 is reflected from a mirror 32 through an optical system comprising a zoom lens 33 and a mirror 34. The zoom lens 33 focusses the light image via the mirror 34 onto the belt 23.

Prior to imaging, the belt 23 is electrostatically charged by a corona charging unit 36. The light image causes the belt 23 to locally photoconduct and form an electrostatic image of the document 28. The electrostatic image is developed by a developing unit 37 to form a toner image on the belt 23.

A stack of copy sheets 38 are provided in a support member such as a tray or cassette 39. A feed roller 41 feeds the top sheet 38 via guides 42 and feed rollers 43 into engagement with the belt 23. The feed of the copy sheet 38 is timed so that the leading edge of the copy sheet 38 is aligned with the leading edge of the toner image on the belt 23. A transfer charging unit 44 applies an electrostatic charge to the back of the copy sheet 38 which causes the toner image to be transferred from the belt 23 to the copy sheet 38. A separator pawl 46 strips the copy sheet 38 off the belt 23 and fixing rollers 47 feed the copy sheet 38 onto a discharge tray 48 to constitute a finished copy 49. The fixing rollers 47 are heated by a lamp 51 to fix the toner image to the copy sheet 38 through a combination of heat and pressure.

A discharging unit 52 discharges the belt 23 after toner image transfer and separation of the copy sheet 38. Any residual toner is removed from the belt 23 by a cleaning unit 53. Further illustrated is a blower 54 for cooling the zoom lens 33.

Although not illustrated, sensor means are provided to sense the size of the copy sheets 38. Said means may comprise marks, notches or the like formed on the cassette 39 which are sensed by sensors mounted on the housing 22. Another alternative is a changeover switch which is manipulated by the operator or automatically changed over when a cassette 39 of a certain size is inserted in the housing 22. Yet another alternative comprises optical sensors, microswitches or the like which sense the size of the sheets 38. Such means are not the particular subject matter of the present invention. It is sufficient to understand that the size of the copy sheets 38 is known.

The following conventions will be used in the detailed description of the present invention. The vertical sizes of the document 28 and copy sheets 38 are taken as the lengths thereof in the horizontal direction of the platen 27 and cassette 39 as viewed in FIG. 5 and lie in the plane of the drawing. The vertical length of the document 28 is illustrated in FIG. 5 and designated as Vd. The vertical length of the copy sheet 38 is also illustrated in FIG. 5 and designated as Vs.

The horizontal length of the document 28 is the length perpendicular to the plane of FIG. 5 and is designated as Hd. The horizontal length of the copy sheet 38 is the length perpendicular to plane of FIG. 5 and is designated as Hs.

Figure 9:
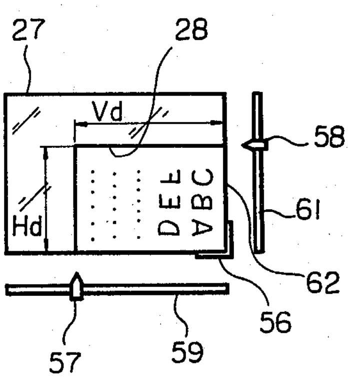
FIGS. 9, 10 and 11 are diagrams illustrating means for sensing the size of an original document in accordance with the present invention.

In accordance with the present invention, sensor means are provided to measure the lengths Vd and Hd of the document 28. FIG. 9 illustrates how the document 28 is placed on the platen 27 so that the lower right corners of the document 38 and platen 27 are aligned. A right angle bracket 56 is mounted at the lower right corner of the platen 27 and ensures perfect alignment since the lower right corner of the document 28 may be firmly abutted against the bracket 56. The sensor means comprises calipers 57 and 58 which are slidably mounted on rails 59 and 61 respectively for manual movement by the operator. In accordance with the present invention, the document 28 is always placed on the platen 27 so that the top of the image on the document 28 is aligned with the right edge of the platen 27 as illustrated at 62.

The caliper 57 is moved by the operator into alignment with the left edge of the document 28. Thus, the distance from the lower right corner of the document 28 to the caliper 57 is equal to the vertical length Vd. The caliper 57 is connected to a transducer such as a potentiometer (not shown) which produces an output proportional to the position of the caliper 57. The output of the transducer is fed to a computing and control unit 63 which controls the zoom lens 33 in a manner which will be described in detail below. The position of the caliper 58 which is moved by the operator into alignement with the upper edge of the document 28 corresponds to the horizontal length Hd of the document 28. A transducer (not shown) connected to the caliper 58 feeds a signal proportional to the position of the caliper 58 to the control unit 63 in the same manner as for the caliper 57.

Figure 10:
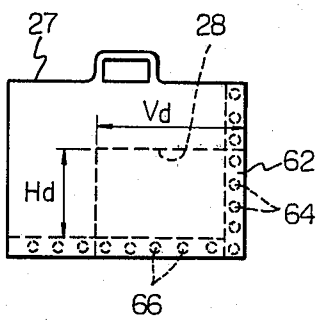

FIG. 10 illustrates another embodiment of the sensor means which comprise photosensors, microswitches or the like 64 which are spaced from each other parallel to the right edge of the platen 27 extending from the lower right corner thereof. Similarly, photosensors, microswitches or the like 66 are spaced from each other parallel to the lower edge of the platen 27 leading from the lower right corner of the platen 27. The sensors 64 and 66 sense for the presence of the document 28 adjacent thereto.

As illustrated, the sensors 64 disposed rightwardly of the left edge of the document 28 will be actuated while the sensors 64 disposed leftwardly of the left edge of the document 28 will not be actuated. This provides the vertical length Vd. In an essentially similar manner, the sensors 66 below the upper edge of the document 28 are actuated while the sensors 66 disposed above the upper edge of the document 28 are not actuated. This provides the horizontal length Hd.

Figure 11:
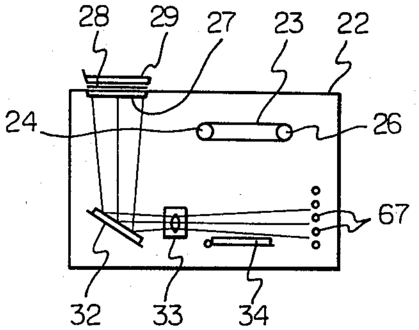

FIG. 11 illustrates another sensor means in which the mirror 34 is movable downwardly to unblock the optical path of the light image of the document 28. Rather than being reflected from the mirror 34, the light image is incident on sensors 67 which are arranged in a manner essentially similar to the sensors 64 and 66 in a right angle pattern. The sensors 67 sense the light image of the document 28 rather than the document 28 itself, but provide an analogous output.

FIGS. *6a*, *6b*, *7a*, *7b*, *8a* illustrate how the reduction ratio of the zoom lens 33 is computed in accordance with the present invention for various relative sizes of the document 28 and copy sheet 38. The copy sheet 38 is illustrated in solid line while the document 28 is illustrated in broken line. The image of the document 28 is also illustrated in broken line and designated as **28*i***.

The first case illustrated in FIGS. *6a* and *6b* is such that the document 28 is smaller than the copy sheet 38 in both dimensions. Although the drawings are not drawn to scale, it will be assumed for purposes of explanation that the ratio of the vertical length Vd of the document 28 to the vertical length Vs of the copy sheet 38 is 0.75. The ratio of the horizontal length Hd of the document 28 to the horizontal length Hs of the copy sheet 38 is 0.33. In accordance with the present invention, the reduction ratio of the zoom lens 33 is set to be equal to the largest of the ratios. In this case, the ratio 0.75 is larger than the ratio 0.33, so the reduction ratio is adjusted to be equal to substantially 0.75. This means that the image is enlarged so that a vertical length Vid of the image **28*i* is made equal to the vertical length Vs of the copy sheet 38. The document 28 and copy sheet 38** are illustrated in FIG. *6a*. The image **28*i* of the document 28 and the copy sheet 38** are illustrated in FIG. *6b*. The computation of the ratios Vd/Vs and Hd/Hs, comparison of the ratios, selection of the highest ratio and control of the zoom lens 33 to provide the highest ratio are performed by the control unit 63.

FIGS. *7a* and *7d* illustrate the second of three possible cases in which one length of the document 28 is larger than the corresponding length of the copy sheet 38 and the other length of the document 28 is smaller than the corresponding length of the copy sheet 38. In this case, the length Vd is smaller than the length Vs and the length Hd is larger than the length Hs.

It will assumed that Vd/Vs=0.5 and Hd/Hs=2.0. Thus, the reduction ratio is selected to be 2.0 which means that the size of the image **28*i* will be one-half the size of the document 28**. The result will be that the horizontal length Hid of the image 28will be made equal to the horizontal length Hs of the copy sheet 38.

Figure 8A:
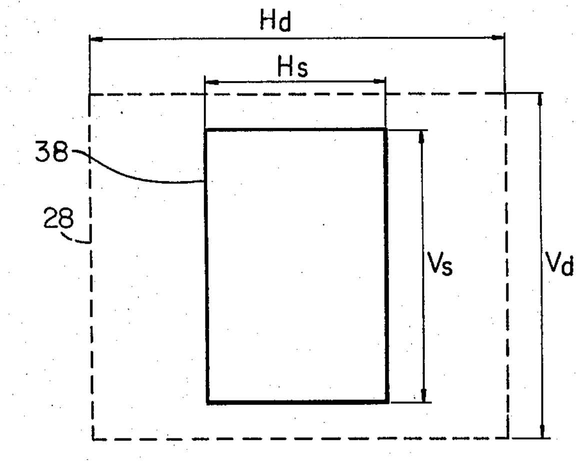
Figure 8B:
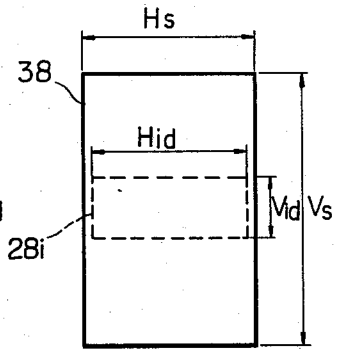

The third possible case is illustrated in FIGS. 8*a* and 8*b* in which both lengths of the document 28 are larger than the lengths of the copy sheet 38. This also indicates that a reduction must be made. It will be assumed that Vd/Vs=1.3 and Hd/Hs=2.0. Thus, the reduction ratio selected is 2.0 which indicates a reduction to one-half size. The horizontal length Hid of the image 28*i* is made equal to the horizontal length Hs of the copy sheet 38.

It will be noted that since the top of the image on the document 28 is always aligned with the right edge 62 of the platen 27 as viewed in FIG. 9, the image will always be aligned in the vertical direction regardless of the relationships of the long and short sides of the document 28 and copy sheet 38.

Figure 12:
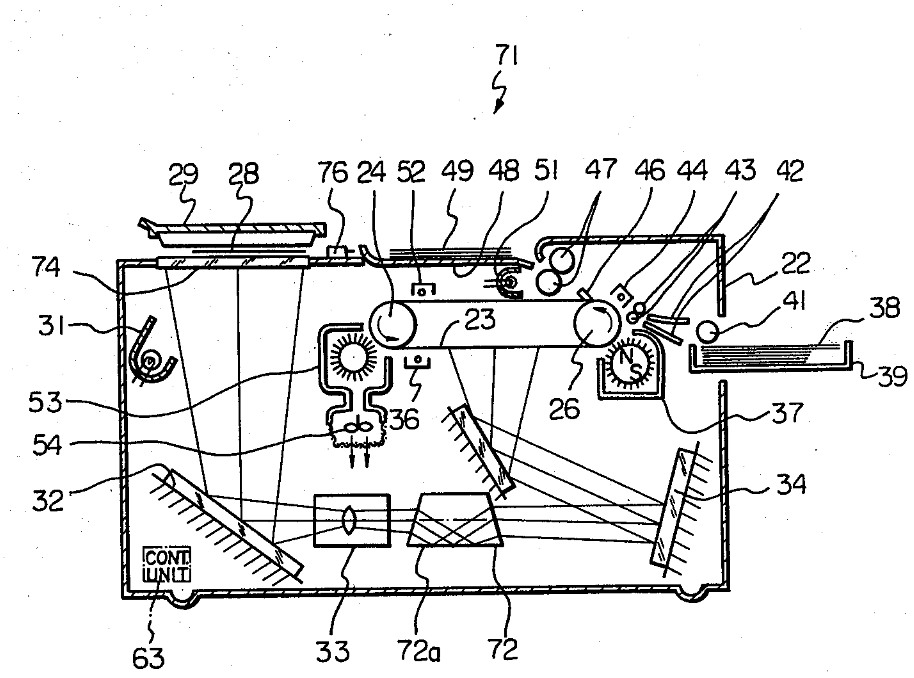
FIG. 12 is a schematic side elevation of another variable magnification electrostatic copying machine embodying the present invention.

While the apparatus 21 is quite satisfactory and convenient, it is possible to further reduce the size of the copying machine by designing the platen to have a size equal to the largest document to be copied. Using the example of A2 size documents, the size of the platen may be reduced to 420 mm×594 mm. A copying machine of this type is illustrated in FIG. 12 and designated as 71. Like elements are designated by the same reference numerals used in FIG. 5.

Figure 13:
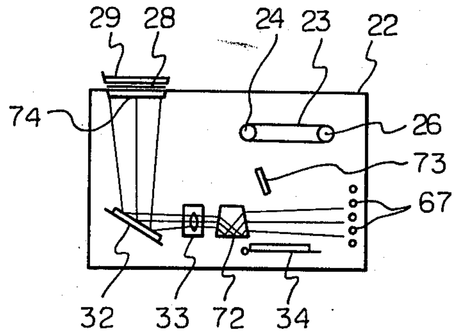
FIG. 13 is a diagram illustrating means for sensing the size of an original document in the embodiment of FIG. 9.

The copying machine 71 comprises a trapezoidal prism 72 disposed between the zoom lens 33 and mirror 34 and also a mirror 73 disposed between the mirror 34 and the belt 23. The prism 72 is also illustrated in FIG. 13 which shows the configuration of FIG. 11 modified to conform to the configuration of FIG. 12.

In the copying machine 71, the document 28 is always placed on a platen 74 so that the long end of the document 28 is parallel to the long end of the platen 74. In this case, the long end of the document 28 will always be Vd. This differs from the embodiment of FIG. 5 in which the image was always in the direction of Vd.

The copying machine 71 further comprises a changeover lever, button, switch, knob or the like which is designated as 76 and mounted on top of the housing 22. The lever 76 is connected to the prism 72 through a drive unit which is not shown.

When the image on the document 28 is parallel to the long side of the document 28 as illustrated in FIG. 1*a*, the operator moves the lever 76 to a first position in which the prism 72 is controlled to assume the position shown in FIG. 12 in which a lower face 72*a* of the prism faces downwardly and the light image of the document 28 passes through the prism 72 without rotation.

When the image on the document 28 is parallel to the short side, as illustrated in FIG. 1*b*, the operator changes the lever 76 to a second position in which the prism 72 is rotated by 45° so that the face 72*a* is aligned at an angle of 45° with the plane of FIG. 12. This causes the image of the document 28 to be rotated by 90° so that the image is parallel to the long side of the copy sheet 38. The rotated light image is sensed by the sensors 67. Various means such as mirrors may be used to rotate the light image by 90° rather than the prism 72.

The effect of the rotation of light image is that the light image will be aligned with the direction of Vs on the copy sheet 38 although the image was aligned with the direction of Hd on the document 28. Thus, the images on all of the copy sheets 38 will be oriented in the direction of Vs regardless of whether the images on the documents 28 were aligned with the direction of Vd or Hd. This is accomplished by means of the lever 76 which controls the position of the prism 72. Alternatively, the lever 76 may be manipulated so that all images on the copy sheets are oriented in the direction of Hs.

Figure 14:
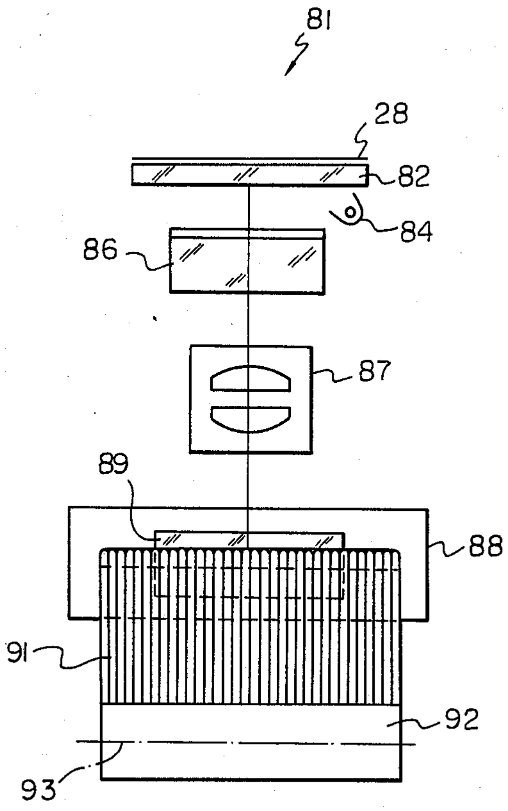
FIG. 14 is a diagram of another embodiment of the present invention in a first position.
Figure 15:
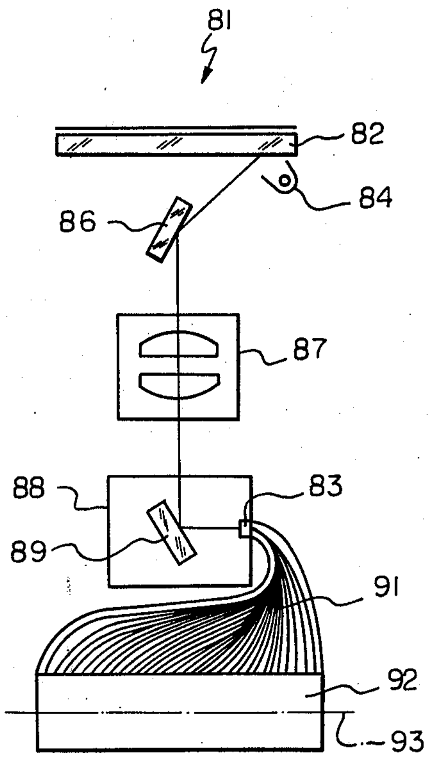
FIG. 15 is a diagram of the embodiment of FIG. 11 in a second position.

FIGS. 14 and 15 illustrate the relevant components of a copying machine 81 comprising a slit type optical system. The copying machine 81 comprises a platen 82 for supporting the original document 28 and a light source 84 for illuminating the document 28. A light image of a linear portion of the document 28 is reflected from a mirror 86 through a zoom lens 87 to a housing 88. A mirror 89 reflects the light image through a focussing screen 83 to the ends of a plurality of flexible optical fibers arranged in a linear array 91. The other end of the array 91 is disposed parallel to and facing a photoconductive drum 92 which is rotated at constant speed about an axis 93.

The mirror 86 and lens 87 may be fixed and the platen 82 and document 28 moved relative thereto. Alternatively, the platen 82 and document 28 may be held stationary and the mirror 86 and lens 87 moved relative thereto in synchronism with the speed of rotation of the drum 92. Either scanning method will progressively form an electrostatic image of the document 28 on the drum 92.

The same effect of rotation the trapezoidal mirror 72 is accomplished by rotation of the mirror 86 and housing 88 by 90°. In the position shown in FIG. 14, scanning is performed perpendicular to the plane of the drawing and there is no rotation of the light image. In FIG. 15, the mirror 86 and housing 88 are rotated by 90° from the positions of FIG. 14 and the light image is rotated by 90°. In this case, scanning is peformed in the horizontal direction in the plane of FIG. 15. Although not shown, a lever or the like which performs the same function as the lever 76 is manually manipulated to indicate whether the image on the document 28 is aligned with the direction of Vd or Hd. Where the image is parallel to Vd, the arrangement of FIG. 14 is selected. Where the image is parallel to Hd, the 90° rotated arrangement of FIG. 15 is selected. The screen 83 may be omitted if desired. It will be noted that 90° rotation of the housing 88 causes rotation of the upper end of the array 91. In the position of FIG. 14 the upper and lower ends of the array 91 ara parallel. In the position of FIG. 15 the upper and lower ends of the array 91 are perpendicular.

Figure 16:
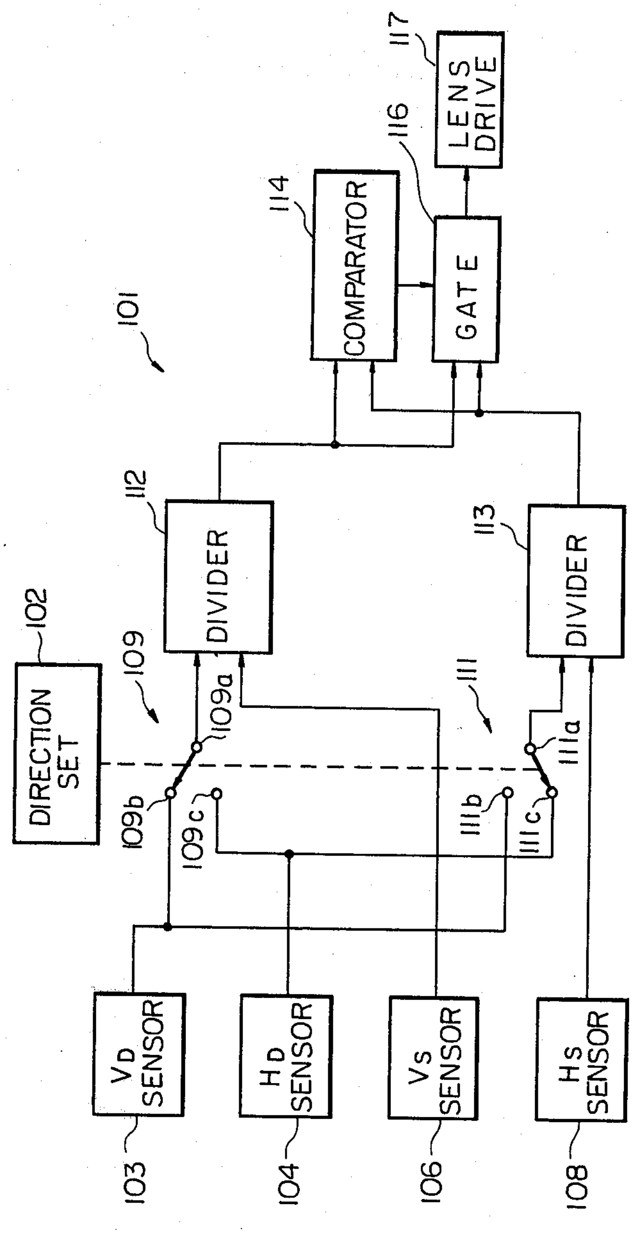
FIG. 16 is a block diagram of a sensing and computing means of the present invention.

FIG. 16 illustrates an embodiment of a control unit 101 for computing the reduction ratio and controlling the zoom lens 33 or 87. A simplified version of the unit 101 is usable in the embodiments of FIGS. 5 and 12. The unit 101 as illustrated is usable where the size of the document 28 is sensed at the platen and the long side of the document 28 aligned with the direction of Vd. The image on the document 28 may be aligned with the direction of Vd or Hd as indicated by the lever 76 or the like.

The unit 101 comprises a direction set 102 operated by the lever 76 which indicates the orientation of the image on the document 28 relative to the long side thereof an sensors 103, 104 106 and 108 for sensing the lengths Vd, Hd, Vs and Hs respectively. The output of the Vd sensor 103 is connected to a fixed contact 109*b* of a switch 109 and to a fixed contact 111*b* of a switch 111. The output of the Hd sensor 104 is connected to a fixed contact 109*c* of the switch 109 and to a fixed contact 111*c* of the switch 111. The output of the Vs sensor 106 is connected to an input of a divider 112. A movable contact 109*a* of the switch 109 is connected to another input of the divider 112. The divider 112 is constructed to divide the input from the contact 109*a* by the input from the sensor 106.

The output of the Hs sensor 108 is connected to an input of a divider 113. A movable contact 111*a* of the switch 111 is connected to another input of the divider 113. The divider 113 is constructed to divide the input from the contact 111*a* by the input from the sensor 108.

The outputs of the dividers 112 and 113 are connected to inputs of a comparator 114 which controls an analog gate 116. The outputs of the dividers 112 and 113 are also connected to inputs of the gate 116. The output of the gate 116 is connected to a lens drive 117 which positions the zoom lens 33 or 87 in accordance with the output of the analog gate 116.

The switches 109 and 111 are ganged together for integral actuation by the direction set 102. When the image on the document 28 is aligned with the direction of Vd, the direction set 102 moves the contacts 109*a* and 111*a* to the illustrated positions in which the output of the Vd sensor 103 is connected to the divider 112 and the output of the Hd sensor 104 is connected to the divider 113. Thus, the divider 112 provides an output equal to Vd/Vs which is applied to the comparator 114 and gate 116. The divider 113 provides an output equal to Hd/Hs which is applied to the comparator 114 and gate 116.

The comparator 114 controls the gate 116 to gate the output of the divider 112 therethrough to the lens drive 117 if the output of the divider 112 is numerically larger than the output of the divider 113. Conversely, the comparator 114 controls the gate 116 to gate the output of the divider 113 therethrough if the output of the divider 113 is numerically larger than the output of the divider 112. Thus, the highest reduction ratio is applied to the lens drive 117.

When the image on the document 28 is aligned with the direction of Hd, the direction set 102 changes over the switches 109 and 111 so that the output of the Hd sensor 104 is applied to the input of the divider 112 and the output of the Vd sensor 103 is applied to the input of the divider 113. The divider 112 produces an output equal to Hd/Vs whereas the divider 113 produces an output equal to Vd/Hs. This has the effect of interchanging the lengths of the sides of the document 28 to compensate for the fact that the image on the document 28 is parallel to the direction of Hd rather than parallel to the direction of Vd. The unit 101 may be simplified for use with the embodiments of FIGS. 5 and 12 by omitting the switches 109 and 111 and directly connecting the output of the Vd sensor 103 to the input of the divider 112 and directly connecting the output of the sensor 104 to the input of the divider 113.

In summary, it will be seen that the present invention overcomes the drawbacks of the prior art and provies a variable magnification electrostatic copying machine which enables automatic adjustment of the magnification ratio to an optimal value regardless of the orientation of the image on the original document and the sizes of the document and copy sheet. Various modifications will become possible for those skilled in the art after receiving the teachings of the present disclosure without departing from the scope thereof.

What is claimed is:

1. An electrostatic copying machine including a platen for supporting an original document, a photoconductive member, a variable magnification optical means for focussing a light image of the document onto the photoconductive member to form an electrostatic image, developing means for developing the electrostatic image to form a toner image, support means for supporting a copy sheet and transfer means for moving the copy sheet from the support means into toner image transferring engagement with the photoconductive member, characterized by comprising:

sensor means for sensing a vertical length and a horizontal length of the document on the platen; and computing means for comparing the vertical and horizontal lengths of the document with vertical and horizontal lengths of the copy sheet and adjusting a reduction ratio of the optical means to a value such that a maximum length of the light image of the document is substantially equal to a corresponding one of the vertical and horizontal lengths of the copy sheet;

the computing means comprising means for dividing the vertical length of the document by the vertical length of the copy sheet to obtain a first ratio, dividing the horizontal length of the document by the horizontal length of the copy sheet to obtain a second ratio, comparing the first ratio with the second ratio and adjusting the reduction ratio of the optical means to be substantially equal to a largest one of the first and second ratios.

2. A copying machine as in claim 1, in which the document is adapted to be manually placed on the platen in such a manner that a corner of the document is aligned with a corner of the platen, the sensor means comprising cursors adapted to be manually moved into alignment with respective edges of the document spaced from said corner of the document.

3. A copying machine as in claim 1, in which the document is adapted to be manually placed on the platen in such a manner that a corner of the document is aligned with a corner of the platen, the sensor means comprising a plurality of sensors spaced along edges of the platen which meet at said corner of the platen.

4. A copying machine as in claim 3, in which the sensors are photosensors.

5. A copying machine as in claim 1, in which the document is adapted to be manually placed on the platen in such a manner that a corner of the document is aligned with a corner of the platen, the optical means comprising a mirror, the sensor means comprising a plurality of photosensors disposed behind the mirror, the sensor means further comprising means for moving the mirror out of an optical path of the light image so that edges of the light image corresponding to edges of the document which meet at said corner of the document are incident on the photosensors.

6. A copying machine as in claim 1, in which the optical means comprises rotation means for selectively rotating an optical axis of the light image between a first position in which a vertical length of the light image corresponding to the vertical length of the document is parallel to the vertical length of the copy sheet and a horizontal length of the light image corresponding to the horizontal length of the document is parallel to the horizontal length of the copy sheet; and a second position in which the vertical length of the light image is perpendicular to the vertical length of the copy sheet and the horizontal length of the light image is perpendicular to the horizontal length of the copy sheet.

7. A copying machine as in claim 6, in which the rotation means comprises a prism.

8. A copying machine as in claim 7, in which the prism is a trapezoidal prism.

9. A copying machine as in claim 6, in which the rotation means comprises a linear array of flexible optical fibers, ends of the array being parallel in the first position and perpendicular in the second position.

10. A copying machine as in claim 1, in which the optical means comprises a zoom lens which is controlled by the computing means.

11. An electrostatic copying machine including a platen for supporting an original document, a photoconductive member, a variable magnification optical means for focussing a light image of the document onto the photoconductive member to form an electrostatic image, developing means for developing the electrostatic image to form a toner image, support means for supporting a copy sheet and transfer means for moving the copy sheet from the support means into toner image transferring engagement with the photoconductive member, characterized by comprising:

sensor means for sensing a vertical length and a horizontal length of the document on the platen; and computing means for comparing the vertical and horizontal lengths of the document with vertical and horizontal lengths of the copy sheet and adjusting a reduction ratio of the optical means to a value such that a maximum length of the light image of the document is substantially equal to a corresponding one of the vertical and horizontal lengths of the copy sheet;

the optical means comprising rotation means for selectively rotating an optical axis of the light image between a first position in which a vertical length of the light image corresponding to the vertical length of the document is parallel to the vertical length of the copy sheet and a horizontal length of the light image corresponding to the horizontal length of the document is parallel to the horizontal length of the copy sheet; and a second position in which the vertical length of the light image is perpendicular to the vertical length of the copy sheet and the horizontal length of the light image is perpendicular to the horizontal length of the copy sheet;

the computing means comprising means for, when the rotation means is in the first position, dividing the vertical length of the document by the vertical length of the copy sheet to obtain a first ratio, dividing the horizontal length of the document by the horizontal length of the copy sheet to obtain a second ratio, comparing the first ratio with the second ratio and adjusting the reduction ratio of the optical means to be substantially equal to a largest one of the first and second ratios; and when the rotation means is in the second position, dividing the vertical length of the document by the horizontal length of the copy sheet to obtain a third ratio, dividing the horizontal length of the document by the vertical length of the copy sheet to obtain a fourth ratio, comparing the third ratio with the fourth ratio and adjusting the reduction ratio of the optical means to be substantially equal to a largest one of the third and fourth ratios.

12. A copying machine as in claim 11, comprising sensor means for sensing the vertical and horizontal lengths of the copy sheet.

* * * * *